United States Patent [19]

Lair

[11] Patent Number: 5,730,392

[45] Date of Patent: Mar. 24, 1998

[54] ADJUSTABLE FAIRING FOR THRUST REVERSERS

[75] Inventor: Jean-Pierre Lair, San Antonio, Tex.

[73] Assignee: Aeronautical Concept of Exhaust, Ltd., San Antonio, Tex.

[21] Appl. No.: 532,176

[22] Filed: Sep. 22, 1995

[51] Int. Cl.$^6$ ..................................... B64C 15/00
[52] U.S. Cl. ..................... 244/110 B; 239/265.33
[58] Field of Search ............ 244/110 B; 239/265.33, 239/265.37, 265.39; 60/230

[56] References Cited

U.S. PATENT DOCUMENTS

| | | | |
|---|---|---|---|
| 2,989,845 | 6/1961 | Howald | 239/265.39 |
| 3,833,187 | 9/1974 | Kahler et al. | 244/110 B |
| 4,049,220 | 9/1977 | Rodgers | 244/110 B |
| 4,349,155 | 9/1982 | Donguy | 239/265.33 |
| 4,410,152 | 10/1983 | Kennedy et al. | 244/110 B |
| 5,181,676 | 1/1993 | Lair . | |
| 5,221,048 | 6/1993 | Lair | 239/265.33 |
| 5,343,696 | 9/1994 | Rohra et al. | 244/110 B |

*Primary Examiner*—Andres Kashnikow
*Assistant Examiner*—Tien Dinh
*Attorney, Agent, or Firm*—Harold H. Dutton, Jr.

[57] ABSTRACT

A fairing for aerodynamically covering the actuation mechanism of a variable area exhaust nozzle, comprising an upper and a lower longitudinally extending half-fairing member and having a generally arcuate cross-section, each of the half-fairing members having an upstream and a downstream end, and two longitudinal edges, the half-fairing members being pivotally connected to each other at a pivot point near the upstream edges and a connection along one of the longitudinal edges of each of said half-fairing members for interengaging the other of the half-fairing members and allowing the half-fairing members to rotate about the pivot point for changing the aerodynamic surface area of the fairing upon variation of the area of the exhaust nozzle.

5 Claims, 3 Drawing Sheets

ADJUSTABLE FAIRING FOR THRUST REVERSERS

This invention relates to a thrust reverser for jet engines, especially the type used on aircraft. More particularly, the invention relates to an self-adjusting fairing for use with a thrust reverser which incorporates a variable area exhaust nozzle. It is of particular relevance and benefit when used with inventions disclosed in U.S. Pat. Nos. 5,181,676 or 4,966,327.

BACKGROUND AND OBJECTS OF THE INVENTION

In order to reduce the landing distance of jet engine powered aircraft, as well as to increase the margin of safety when the aircraft is landing on a wet or icy runway, thrust reversers are utilized on the jet engines to provide a breaking thrust for the aircraft. Typically, such thrust reversers are formed by thrust reverser doors which are capable of pivoting between two positions on an axis which is transverse and substantially diametrical with respect to the jet of the engine.

The first or stowed position finds the doors stored out of the direct path of the exhaust blast of the engine. In this position, the doors form the exhaust nozzle of the gas turbine engine, so that the thrust of the engine is directed rearward, thereby producing the forward thrust in the aircraft.

In the second or deployed position, the doors are pivoted about the pivot axis to a transverse blast deflecting position to intercept and redirect the jet blast and produce the braking thrust for the aircraft when needed.

In such thrust reversers, the actuating mechanism which moves the doors from their stowed position to their deployed position, and vice versa, is housed laterally of the engine and between the doors. The actuation system is generally covered or enclosed by a cover or fairing which is intended to ensure aerodynamic continuity with the adjacent reverser doors, most particularly during the forward thrust mode. In conventional thrust reverser installations, the fairing is of fixed size or area, since in the forward thrust mode, the exhaust nozzle of the gas turbine engine is formed by the thrust reverser doors and the size of the nozzle does not vary. Therefore the fairing which covers the actuation mechanism need only have a fixed area.

By contrast, U.S. Pat. No. 5,181,676 describes a thrust reverser which integrates a variable area exhaust nozzle. In such a thrust reverser system, the exhaust area of the nozzle can be adjusted to optimize forward thrust performance of the gas turbine engine upon which the reverser mounts. The actuation mechanism which drives the variation of the exhaust area nozzle and the deployment of the thrust reverser doors is housed between the reverser doors. While it is desirable for the actuation system to be covered by a fairing for ensuring aerodynamic profile continuity with the adjacent reverser doors and associated exhaust area nozzles, prior art technology is not adequate, since a fairing of a fixed size cannot fill in a space having a variable area. Instead, this requires that the fairing must be variable in order to accommodate changes in the area of the exhaust nozzle.

Accordingly, a primary object of the present invention is to provide a fairing capable of covering the actuating mechanism for a variable nozzle thrust reverser.

Another object of the invention is to provide an adjustable fairing which can accommodate variation in the size of the nozzle opening and ensure profile continuity for any size or angular position of a variable area exhaust nozzle.

Still another object of the invention is to provide a fairing which is self-adjusting to accommodate and fill different size openings while covering the actuating mechanism for thrust reversers of the type described.

A further object of the invention is to provide a fairing wherein the exhaust nozzle is the driving means which adjusts the fairing, or, in an alternative embodiment, wherein the thrust reverser doors provide the driving force which adjusts the fairing.

These and other objects and advantages of the invention will become apparent the following description of the invention.

DESCRIPTION OF THE INVENTION

The present invention provides an adjustable fairing for use on a thrust reverser which integrates a variable exhaust area nozzle. The fairing is driven either by the exhaust nozzle or the reverser doors and covers the complete space between the assembly comprising reverser doors and exhaust nozzles. The fairing provides optimum aerodynamic continuity for any angular position of the assembly described above. The fairing has the ability to adjust its area as a function of the angular position of the variable exhaust nozzle.

The fairing according to the present invention is made of two halves which have a relative sliding fit and are capable of sliding with respect to each other in order to vary the area of the overall fairing. The two halves of the fairing are connected at a pivot point near their upstream terminus, and are connected to the pivot connection of exhaust nozzle near their downstream ends.

Thus, when the area of the exhaust nozzle changes as described, for example in U.S. Pat. No. 5,181,676, the apparent or aerodynamic size of the fairing is adjusted in order to continue to cover the actuating mechanism while filling the space between the thrust reverser doors or the components of the variable nozzle, thereby maintaining the aerodynamic flow lines which are so important to the performance characteristics of the engine and the aircraft.

The specification of U.S. Pat. No. 5,181,676 is incorporated herein by reference for a detailed description of portions of the structure of the thrust reverser, the variable nozzle and the actuator mechanism with which the present invention may be desirably utilized.

DESCRIPTION OF THE DRAWINGS

The invention will now be described in greater detail with particular reference to the accompanying drawings, which show by way of non-limiting example preferred features and embodiments of the invention. In the drawings.

DETAILED DESCRIPTION OF THE PREFERRED EMBODIMENTS

Figure 1:
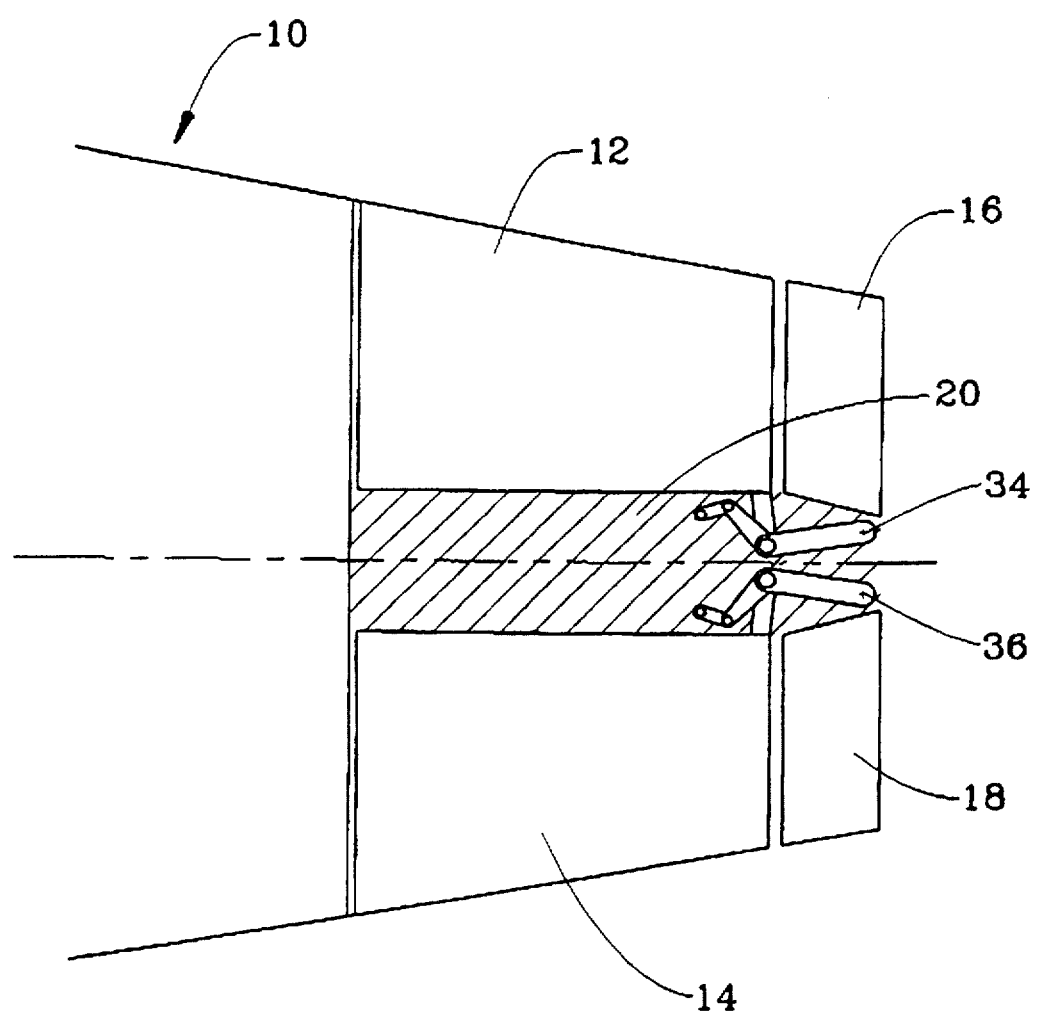
FIG. 1 is a schematic longitudinal side view of a jet engine showing the thrust reverser and exhaust nozzle in the minimum exhaust position, the fairing being removed in this depiction, but covering the cross-hatched area.

As shown in FIG. 1, the rear end of a jet engine generally designated 10 is provided with the thrust reverser formed by doors 12, 14 and includes a variable exhaust area nozzle formed by reverser doors 12, 14 and their associated exhaust nozzles or half-shells 16, 18 in the minimum exit area position. For clarity of the drawings, the driving mechanism and latching system are not depicted in this view, but are shown in greater detail in my prior U.S. patent mentioned above. The driving mechanism and latching system are usually installed inside space 20, the space being shown cross-hatched in FIGS. 1 and 2, and are covered by a fairing schematically represented in FIG. 3. It will be understood that a similar fairing is used on each lateral side of the engine.

Figure 2:
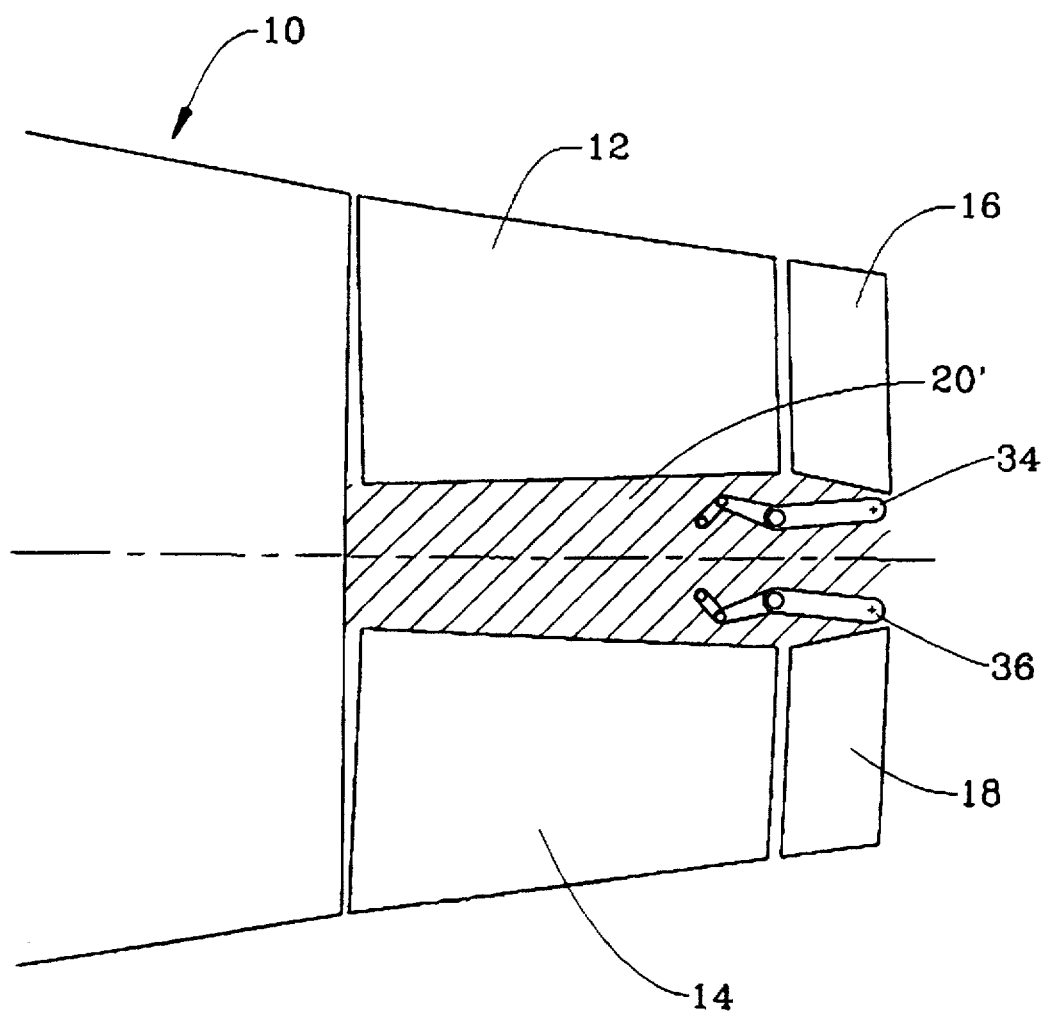
FIG. 2 is a schematic longitudinal side view of a jet engine similar to FIG. 1 and showing the thrust reverser and exhaust nozzle in the maximum exhaust area position, the fairing also being removed in this depiction.
Figure 3:
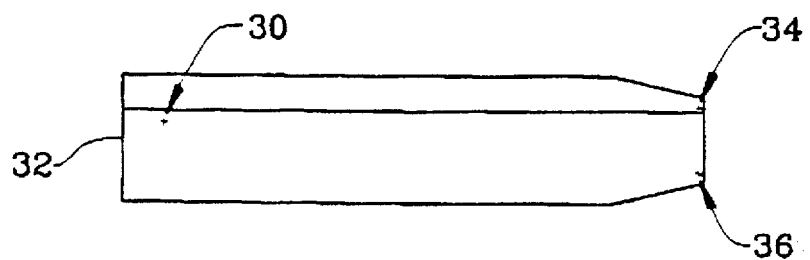
FIG. 3 is a schematic view of the fairing in its position having a minimum area.
Figure 4:
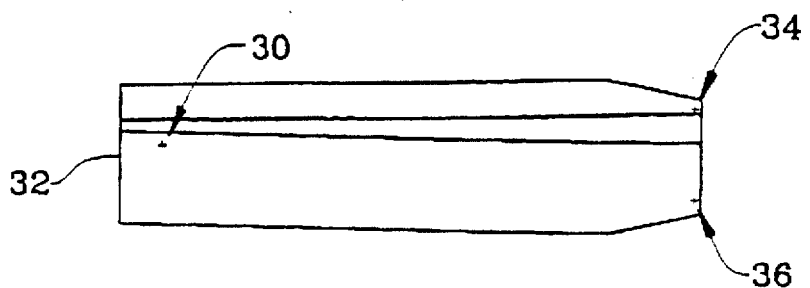
FIG. 4 is a schematic view of the fairing in its position having a maximum area.

When the assembly formed by the thrust reverser doors 12, 14 and their associated exhaust nozzles 16, 18 is opened up to the maximum nozzle exit area, as schematically represented in FIG. 2, then the space 20 to be covered by a fairing becomes significantly larger, as schematically represented in FIG. 4.

In order to ensure optimum outer profile continuity for any angular position of the variable area exhaust nozzle, the present invention provides a fairing which has the capability to adjust its own area as a function of the angular position of the variable area exhaust nozzle.

Figure 6:
FIG. 6 is an enlarged cross-sectional view of FIG. 4 along lines VI—VI and viewed in the direction of the arrows.
Figure 5:
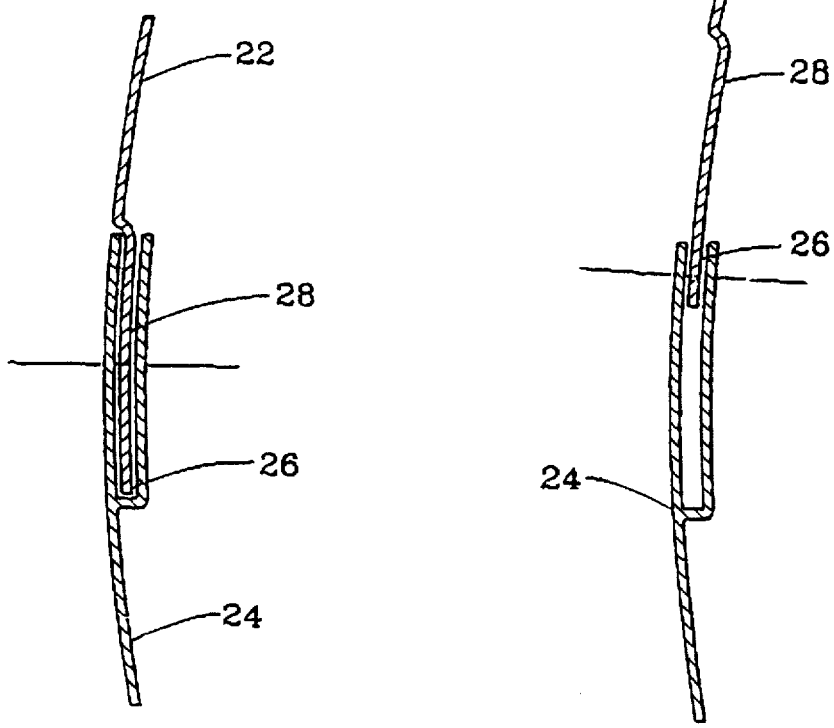
FIG. 5 is an enlarged cross-sectional view of FIG. 3 along lines V—V and viewed in the direction of the arrows.

As shown in the cross-sectional views of FIGS. 5 and 6, the fairing is comprised of two halves 22 and 24 which have the capability to engage one another. One edge of half 24 is configured with a channel 26, while the corresponding edge of half 22 includes an extension 28 configured to penetrate said channel 26.

Each fairing half is connected to its cooperating half at a pivot point 30 mounted in the vicinity of the respective upstream edge 32 of the fairing. The upper half 22 of the fairing is connected on its downstream end to the pivot point 34 of exhaust nozzle 16. Similarly the lower half of the fairing is connected on its downstream end to pivot point 36 of exhaust nozzle 18.

As explained in detail in U.S. Pat. No. 5,181,676, and illustrated in FIG. 13 of that patent, the assembly of the reverser doors and exhaust nozzles moves slightly rearward as the nozzle exit area opens up. Therefore, the adjustable fairing of the present invention connected to the pivot points 30 and 34 of the exhaust nozzle, is allowed the same rearward motion as the assembly. This motion is accommodated by any suitable means, including but not limited to, slots provided in the supports of each fairing half.

While this invention has been described as having certain preferred features and embodiments, it will become apparent that it is capable of still further variation and modification without departing from the spirit of the invention, and this application is intended to cover any and all variations, modifications and adaptations of the invention as may fall within the spirit of the invention and the scope of the apprended claims.

I claim:

1. A fairing for aerodynamically covering the actuation mechanism of a variable area exhaust nozzle, comprising:

an upper and a lower longitudinally extending half-fairing member and having a generally arcuate cross-section, each of said half-fairing members having an upstream and a downstream end, and two longitudinal edges, said half-fairing members being pivotally connected to each other at a pivot point near said upstream edges and means along one of the longitudinal edges of each of said half-fairing member for interengaging the other of said half-fairing members and allowing said half-fairing members to rotate about said pivot point for changing the aerodynamic surface area of said fairing upon variation of the area of the exhaust nozzle.

2. A fairing, as in claim 1, wherein said one of the longitudinal edges includes a channel portion, and said other of the longitudinal edges includes an extension portion configured to enter into said channel upon rotating of said half-fairing members.

3. A fairing, as in claim 2, wherein each half-fairing member includes means for allowing longitudinal movement to accommodate changing position of the variable area exhaust nozzle.

4. A fairing, as in claim 2, wherein each half-fairing member is pivotally connected to a pivot point of said variable area exhaust nozzle for movement in response to variation in the area of the nozzle.

5. A fairing, as in claim 4, wherein each half-fairing is pivotally connected to the pivot point of an adjacent thrust reverser door.

* * * * *